H. MEREDITH-JONES.
MOVING PICTURE CAMERA.
APPLICATION FILED OCT. 29, 1908.
943,253.
Patented Dec. 14, 1909.
2 SHEETS—SHEET 1.
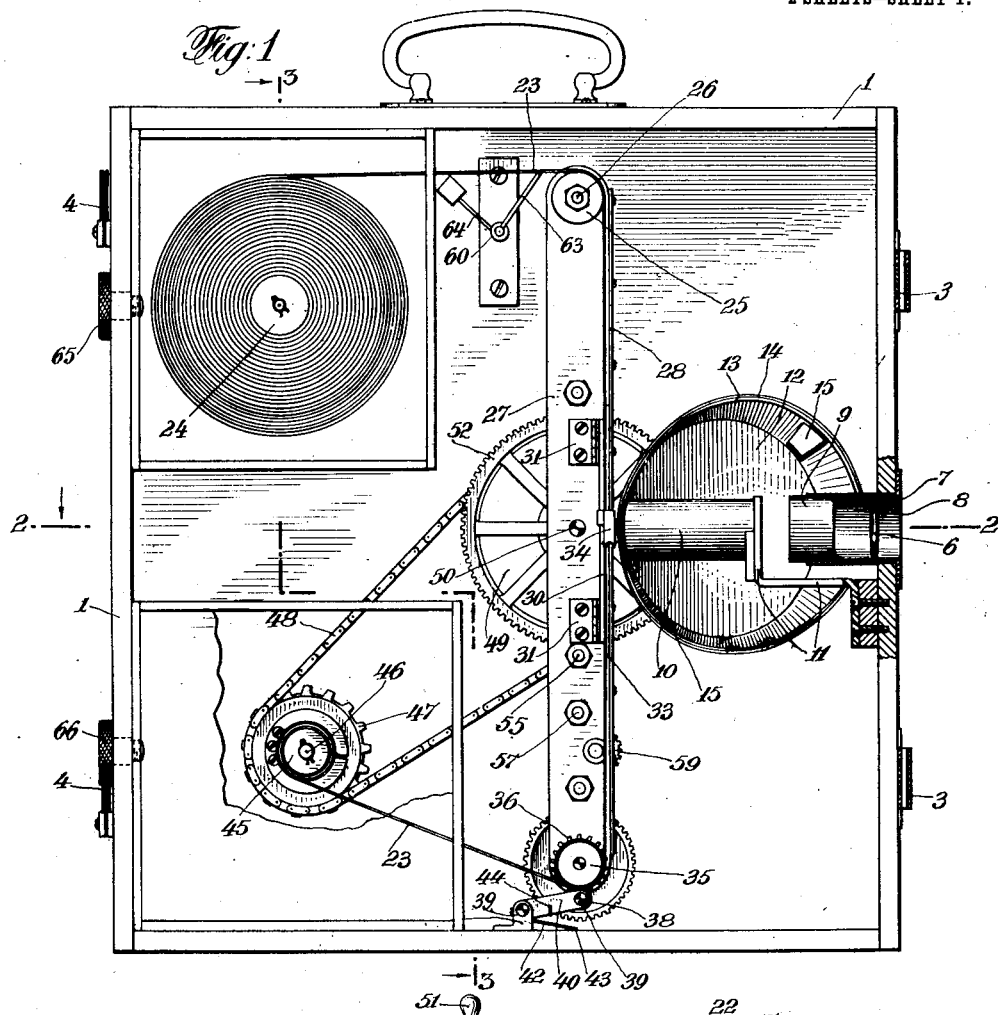
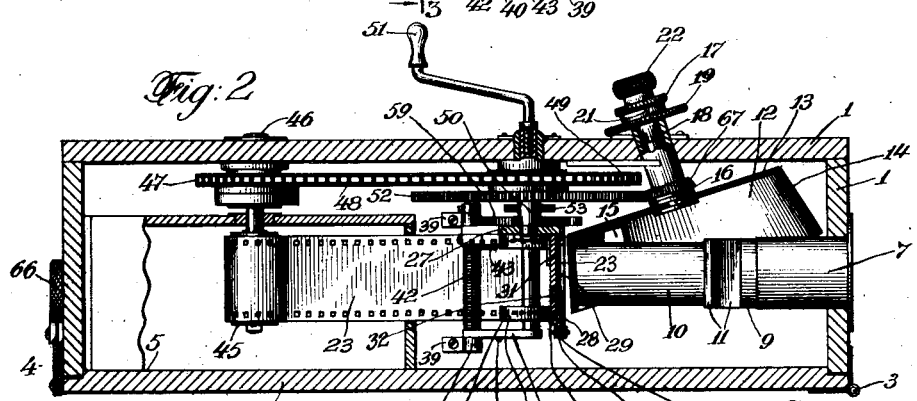
Witnesses:
M. Meikle.
A. Newcomb.
Inventor
Hubert Meredith-Jones
By his Attorneys
Prindle & Wright

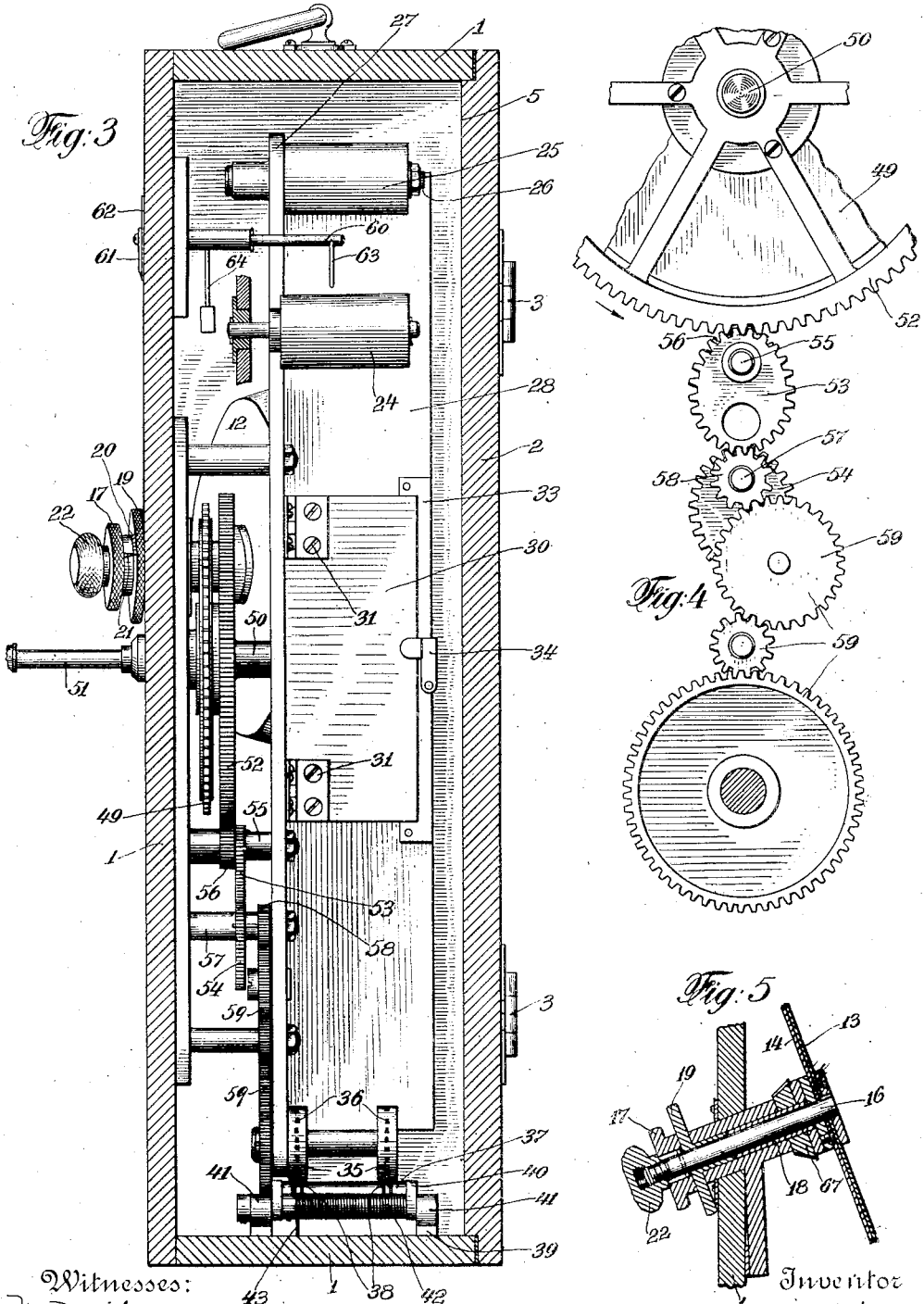

UNITED STATES PATENT OFFICE.

HUBERT MEREDITH-JONES, OF NEW YORK, N. Y., ASSIGNOR OF ONE-HALF TO CHARLES M. MAPES, OF NEW YORK, N. Y.

MOVING-PICTURE CAMERA.

943,253.  Specification of Letters Patent.  Patented Dec. 14, 1909.

Application filed October 29, 1906. Serial No. 460,029.

*To all whom it may concern:*

Be it known that I, HUBERT MEREDITH-JONES, of New York, in the county of New York, and in the State of New York, have invented a certain new and useful Improvement in Moving-Picture Cameras, and do hereby declare that the following is a full, clear, and exact description thereof.

My invention relates to an improvement in moving picture cameras, and the object of my invention is to avoid the many disadvantages present in the types of moving picture cameras now in use.

The cameras at present in use either involve the use of a film moving at a constant speed, in which case recourse is had to an intermittently moving mirror to cause the image to move at the same speed as the moving film, or the film itself is intermittently moved, stopping for each picture to be taken. The disadvantages of the first mentioned system are very pronounced, as a great deal of the light is absorbed by the mirror in being reflected from the superficial surface thereof back to the main reflecting surface, or the reverse, and owing to the partial polarization of the light which falls upon the mirror. Again, a further disadvantage of this system results from the fact that it is impossible to construct an absolutely perfect mirror, so that the image is always to some extent distorted; and a still further disadvantage of the same system is that the imperfections in the image are magnified by reflection from the mirror to the moving strip of film. It is because of these numerous disadvantages that this particular system has not come into practical use. In the case of the other system where use is made of an intermittently moving film, there is a great liability to tear the film because of the sudden starting and stopping of the same through the action of certain fingers which register with the holes located at the sides of the film for the purpose of advancing the same. Because of this construction, furthermore, it is necessary to make the said holes somewhat larger than the arms or fingers which are intended to fit within the same. This results in allowing the film to move to some extent out of its exact registering position, the ultimate result of which is to produce a flickering on the screen when the pictures are projected by means of a lantern. Again, a number of machines of this type depend for an advancement of the film, upon giving the film during each movement a certain momentum which is intended to carry it to a new position, part of which movement is designed to be carried out during the disengagement of the moving fingers, In machines of this character a difference in the weight of the film at a certain point, or in its thickness and consequent friction against the guides, results in preventing the film from stopping at the exact desired point after having received its momentum above referred to. This also results in the production of a lack of registry of the pictures in the ultimate projection of the film upon a screen. In my apparatus I avoid all of these objections by constructing the apparatus so that the film is continuously moved during the time that the pictures are being taken and also, of course, during the interval between the taking of the individual pictures. At the same time I do not find it necessary to make use of a mirror for projecting a moving image upon the moving strip of film, but have discovered that with an apparatus such as that embodying my invention, excellent, clear cut and effective pictures can be taken while the film is moving.

In the accompanying drawings, I have shown one embodiment of my invention, in which—

Figure 1 is a longitudinal vertical section of the camera constituting one embodiment of my invention; Fig. 2 is a horizontal section of the same taken on line 2—2 of Fig. 1; Fig. 3 is a vertical transverse section of the same taken on line 3—3 of Fig. 1; and Figs. 4 and 5 are fragmental views of details, to be hereinafter described.

In the drawings, 1 is a case for the camera, having a door 2 supported upon hinges 3 and adapted to be locked into its closed position by means of spring catches 4. It will be noted that the door is provided with a raised surface 5 on its inner face so as to make a light tight joint. A lens 6 fits within a cylinder 7, which has an aperture 8 opening through the camera case. The lens may, of course, be of any ordinary or usual type. I have provided the inner end of the cylinder 7 with a short adjustable cylinder 9 which is designed to be placed in position in the rear end of the cylinder 7, after the lens has been placed in its proper position. The purpose of the adjustable cylinder 9 is to bridge the gap between the cylinder 7 and a second cylinder 10 extending rearwardly within the camera and supported upon a bracket 11 projecting from the camera case 1. Immediately in the rear of the second cylinder 10, I locate the edge of a rotary shutter 12, which is constructed in the shape of a truncated cone and comprises two shells, an inner shell 13 and an outer shell 14 of this shape, the conical parts of said shells 13 and 14 being each provided with two square apertures 15 registering with each other. These shells 13 and 14 are adapted to be rotated and are therefore situated upon a movable axis located at such an angle to the cylinders 7 and 10 as to cause the conical portions of the shells 13 and 14 to fit squarely over the rear end of the cylinder 10. The two shells 13 and 14 are movable upon the same axis independently of each other, for the purpose of decreasing or increasing the size of the light aperture. In order to effect this relative movement, the inner shell is located upon a main shaft 16, which extends outside of the camera case 1, and is provided with a milled head 17 located at this point, and the outer shell 14 is located upon a sleeve 18 which is provided with a similar milled head 19 also located on the outside of the casing. The milled head 19 is provided with graduations 20 upon its periphery, and the milled head 17 has extending therefrom a pointer 21 so as to indicate the relative position of the shells 13 and 14. After an adjustment has been made of the relative positions of the milled heads 17 and 19, and as a consequence the shells 13 and 14, a thumb screw 22, which is located upon the end of the shaft 16, is screwed up so as to tighten the milled head 17 against the milled head 19 and thus retain them in their adjusted positions. In order to effect this arrangement, the milled head 17 is carried loosely upon the shaft 16, to which it is secured by means of splines.

The film is introduced into the camera upon a spool 24, located at the upper rear corner of the casing. In starting the film preparatory to taking pictures, the film is led forwardly over a spool 25, which is carried loosely upon a shaft 26 supported in horizontal position from a vertical bar 27. The spool 25 instead of being a mere idler or guide may, however, be substituted by a positively driven spool driven from the common source of movement. After leaving the spool 25, the film 23 is led along the rear face of a plate 28 attached to one side of the bar 27 and provided with an aperture 29, the size of the individual picture to be taken. Opposite the aperture 29 and extending a considerable distance above and below the same, I have located a rear guide-plate 30, which is hinged at 31 to the vertical bar 27. This plate 30 may be covered with soft fabric or cushioning material 32 of any desired character. Along the same portion of the plate 28 and on the outer edge thereof opposite the hinges 31 of the rear guide-plate 30, I have located a short guide bar 33 so as to prevent any lateral movement of the film. When once the film has been inserted between the plate 28 and the rear guide-plate 30, the latter is moved upon its hinges until it lies flat upon the plate 28, when a catch 34 is moved so as to secure it in this position. The film which is provided with a series of holes on either side thereof is now led over a bobbin 35 having teeth 36 thereon which are adapted to register with the two series of holes on the two sides of the strip of film.

A spring-pressed idler 37 provided with two pairs of annular projections 38, each of which is designed to fit around the teeth 36, is adapted to press the film upwardly against the under face of the bobbin 35. The idler 37 is carried in a bracket 39 having arms 40, to which the idler is pivoted, and is itself pivoted in the journals 41 attached to the casing 1. A spring 42 is located upon a portion of the bracket 39, extending between the journals 41, and has one end 43 extended along the inner face of the camera casing, and the other end 44 twisted around one of the arms 40, so as to cause the bracket 39 to be always maintained in contact with the bobbin 35. After leaving the bobbin 35, the film is led around a spool 45 carried upon a positively driven shaft 46 from which it is adapted to be detachable for the purpose of inserting new spools. The shaft 46 carries a sprocket wheel 47 having a chain 48 connecting the same with a larger sprocket wheel 49 carried upon a shaft 50. The said shaft 50 is adapted to be positively driven from a handle 51 located on the outside of the camera case 1, which handle may be removed if desired from connection with the shaft 50 by rotating the handle in a left-hand direction. The camera is adapted to be operated by moving the handle in the reverse or right-hand direction. The shaft 50 also carries a large gear wheel 52, which is connected by a suitable mechanical movement to the bobbin 35 for driving the same at a variable speed. The object of this arrangement is to move the film at a relatively low speed during the time that the picture is being taken, and a relatively high speed during the interval between the taking of the pictures. Any of the many types of mechanical movements may be used for effecting this end, but in the embodiment of my invention shown in the accompanying drawings, I have shown this feature of my apparatus as comprising a pair of elliptical gears 53 and 54, which mesh with one another, the former gear 53 being carried upon a shaft 55 supported by the bar 27. The shaft 55 also carries a smaller circular gear 56 which meshes with the gear 52 located upon the shaft 50. The other elliptical gear 54 is carried upon a shaft 57 similar in every respect to the shaft 55. This shaft 57 also carries a small gear wheel 58, from which motion is conveyed by any suitable train of gears 59 to the bobbin 35. Upon rotating the handle 51, it will thus be seen that the film is constantly advanced by the bobbin 35, and the film is re-wound upon the spool 45 by means of the sprocket and chain above referred to.

At the top of the camera I locate an indicator for indicating the completion of the unwinding of the film from the spool 24. This indicator comprises a shaft 60 having a pointer 61 extending on the outside of the casing above a graduated disk 62; and an arm 63, which extends beneath the film 23. The shaft 60 also carries a weighted arm 64 which operates to withdraw the arm 63 toward the rear of the camera. When the film is inserted in the camera, the arm 63 is moved toward the front thereof beneath the film 23, and is retained in this position throughout the operation of the camera until the film is entirely unwound from the spool 24 and wound upon the spool 45. When the film is in this manner entirely unwound, the arm 63 is carried toward the rear of the camera through the action of the weighted arm 64, and this movement is indicated by the pointer 61 located upon the outside of the camera casing 1.

The film holders carrying the spools 24 and 25 are held in their proper positions in the camera by means of screws 65 and 66, which project from and are operable from the outside of the camera.

The sleeve 18 carries a gear 67 which is so positioned as to mesh with the gear 52, to drive the shutter.

In the operation of the apparatus, a film carried upon a spool 24 is inserted at the rear of the camera; the free end of the film is led over the arm 63 which has been previously moved toward the front of the camera; and the film is then passed around the spool 25 and led between the plate 28 and the rear guide plate 30. The rear guide plate 30 has, of course, been moved rearwardly upon its hinges 31, so as to permit the film to be inserted. After the insertion of the film between the plates 28 and 30, the plate 30 is again moved into its usual position parallel with the plate 28, where it is retained by means of the catch 34. The film is then led downwardly around the bobbin 35 and over the idler 37. Finally the film is attached at its end to the spool 45 which is carried upon the shaft 46. If now it is desired to take a picture of a moving object, it is merely necessary to turn the handle 51 slowly in a right-hand direction.

This results in a constant feeding or movement of the film along the plate 28 through the agency of the bobbin 35, the teeth 36 of which register with the holes in the two sides of the film. The nature of the gearing is such, however, as to cause the film to move somewhat slowly while a picture is being taken and then to move much more rapidly during the interval before the taking of the next succeeding picture. During this constant feeding of the film, the shutter is, of course, also constantly rotated, the apertures of the shutter being adapted to register with the aperture 29 in the plate 28 at the times when it is intended for pictures to be taken. The light aperture in the shutter can, of course, be varied by moving the two conical shells 13 and 14 relatively to one another and setting them in any given position. When the film has been entirely unwound, the arm 63 is moved by means of the attached weighted lever 64, and the pointer 61 indicates on the outside of the casing that the film has been entirely used up. I have thus discovered that sharp, effective pictures can be taken upon a constantly moving film, an arrangement which has many advantages. The pictures can be taken more rapidly by this system because of the constant movement of the film, and there is much less liability to fracture the film, as it is not required to constantly start and stop it in the ordinary operation of the machine. There is, furthermore, more regularity and uniformity in the pictures so produced, as the film is constantly moved forward by engagement with a circular bobbin with which it is always in register.

While I have described by invention above in detail, I wish it to be understood that I consider my invention to be a broad one and capable of many changes and adaptations without departing from the spirit thereof.

Many of the features of my invention are equally applicable to a projecting machine.

I claim:

1. In a device of the character described, the combination of a camera case, means for constantly moving a film therein and means for projecting an image of the object to be taken straight from the object to the film while moving.

2. In a moving picture camera, the combination of a camera case, means for moving a film therein constantly and at a variable speed, and means for exposing said film to the light while moving, to take a photograph.

3. In a moving picture camera, the combination of a camera case, means for moving a film therein constantly and at a variable speed and means for exposing the film to the light during the slow movement thereof, to take a photograph.

4. In combination, a camera case, elliptical gearing for moving the film therein constantly and at a variable speed, and means for exposing said film to the light while moving, to take a photograph.

5. In combination, a camera case, elliptical gearing for moving a film therein constantly and at a variable speed, and means for admitting the light thereto during the slow movement thereof, to take a photograph.

6. In combination, a camera case, a spool therein for carrying a film, means for moving the film therein constantly and at a variable speed, a positively driven spool for winding up the film as it is used, and means for exposing said film to the light while moving, to take a photograph.

7. In a device of the character described, the combination of a camera case, an upper guide roll for carrying a film therein, a lower feeding bobbin for feeding the film, means for constantly moving said bobbin at a variable speed and means for exposing said film to the light, to take a photograph.

8. In combination, a camera case, means for moving a film therein at a certain speed while light is being admitted to it and at a faster speed until the light is again admitted, and means for exposing said film to the light to take a photograph.

9. In a device of the character described, the combination of a case, means for constantly moving a film therein, means for projecting light upon said moving film, and means for maintaining said film in the same plane while the light is being projected upon it.

10. In a device of the character described, the combination of a case, means for constantly moving a film therein at a variable speed, means for projecting light upon said moving film and means for maintaining said film in the same plane while the light is being projected upon it.

11. In a device of the character described, the combination of a case, a spool therein for carrying a film, means for constantly moving said film at a variable speed, and means for projecting light upon said moving film.

In testimony that I claim the foregoing I have hereunto set my hand.

HUBERT MEREDITH-JONES.

Witnesses:
M. MEIKLE,
EDWIN J. PRINDLE.